United States Patent [19]

Spletter et al.

[11] Patent Number: 5,083,007
[45] Date of Patent: Jan. 21, 1992

[54] BONDING METAL ELECTRICAL MEMBERS WITH A FREQUENCY DOUBLED PULSED LASER BEAM

[75] Inventors: Philip J. Spletter, Cedar Park; Rama R. Goruganthu, Austin, both of Tex.

[73] Assignee: Microelectronics and Computer Technology Corporation, Austin, Tex.

[21] Appl. No.: 561,555

[22] Filed: Aug. 1, 1990

[51] Int. Cl.$^5$ .............................................. B23K 26/00
[52] U.S. Cl. .......................... 219/121.64; 219/121.63; 372/22
[58] Field of Search .................... 219/121.63, 121.64; 372/22, 23, 34, 27, 98, 102, 108

[56] References Cited

U.S. PATENT DOCUMENTS

| | | | |
|---|---|---|---|
| 3,975,693 | 8/1976 | Barry et al. | 372/22 |
| 4,023,005 | 5/1977 | Bolin | 219/121.85 |
| 4,127,827 | 11/1978 | Barry et al. | 372/22 |
| 4,320,281 | 2/1982 | Cruickshank et al. | 219/121.64 |
| 4,330,699 | 5/1982 | Farrow | 219/121.64 |
| 4,341,942 | 7/1982 | Chaudahari et al. | 219/121.64 |
| 4,348,263 | 9/1982 | Draper et al. | 204/29 |
| 4,394,711 | 7/1983 | Conley | 361/408 |
| 4,404,453 | 9/1983 | Gotman | 219/121.64 |
| 4,471,204 | 9/1984 | Takafuji et al. | 219/121.64 |
| 4,495,255 | 1/1985 | Draper et al. | 428/669 |
| 4,534,811 | 8/1985 | Ainslie et al. | 156/73.1 |
| 4,535,219 | 8/1985 | Silwa, Jr. | 219/121.63 |
| 4,547,652 | 10/1985 | Raisig et al. | 219/121.64 |
| 4,587,395 | 5/1986 | Oakley et al. | 219/121.64 |
| 4,691,092 | 9/1987 | Verburgh et al. | 219/121.64 |
| 4,697,061 | 9/1987 | Spater et al. | 219/121.64 |
| 4,727,246 | 2/1988 | Hara et al. | 235/488 |
| 4,739,507 | 4/1988 | Byer et al. | 372/66 X |
| 4,756,003 | 7/1988 | Baer et al. | 372/27 X |
| 4,845,335 | 7/1989 | Andrews et al. | 219/121.63 |
| 4,845,354 | 7/1989 | Gupta et al. | 250/205 |
| 4,887,270 | 12/1989 | Austin | 372/34 X |
| 4,930,901 | 6/1990 | Johnson et al. | 372/26 |
| 4,978,835 | 12/1990 | Luijtjes et al. | 219/121.64 |

OTHER PUBLICATIONS

Burns et al., "Laser Microsoldering, " Apollo Lasers, Inc., Los Angeles, Cal., pp. 115-124.
Avramchenko et al., "The Pulsed Laser Welding of Conductors to Films in the Manufacturing of Micro Devices," Avt. Svarka, No. 5, pp. 20-21, 1978.
Okino et al., "Yag Laser Soldering System for Fine Pitch Quad Flat Package (QFP)," IEEE, pp. 152-156, 1986.
Lish, "Application of Laser Microsoldering to Printed Wiring Assemblies," Institute for Interconnecting and Packaging Electronic Circuits, IPC-TP-538, IPC 28th Annual Meeting Apr. 1985.
MacKay et al., "Solder Sealing Semiconductor Packages," IEEE Transactions on Components, Hybrids, and Manufacturing Technology, vol. CHMT-9, No. 2, Jun. 1986.
Greenstein, "Optical Absorption Aspects of Laser Soldering for High Density Interconnects," Applied Optics, vol. 28, No. 21, Nov. 1, 1989.

*Primary Examiner*—C. L. Albritton
*Attorney, Agent, or Firm*—David M. Sigmond

[57] ABSTRACT

Metal electrical members bonded by coupling to at least one member a frequency doubled pulsed Nd:YAG laser comprising 533 and 1064 nm wavelengths is described. Frequency doubling is accomplished by directing a 1064 nm wavelength pulsed Nd:YAG laser at an intracavity nonlinear crystal such as potassium titanyl phosphate between a highly reflective mirror and a partially reflective mirror to produce frequency doubling. An infrared reflector outside the cavity can reduce the 1064 nm wavelength thereby increasing the percentage of 533 nm wavelength. Alternatively the laser beam can be split and the separate wavelengths directed to separate attenuators to allow the percentage of both 533 nm and 1064 nm wavelengths to be adjusted. A gold bump on an integrated circuit can be bonded to a gold plated copper TAB tape lead.

36 Claims, 4 Drawing Sheets

BONDING METAL ELECTRICAL MEMBERS WITH A FREQUENCY DOUBLED PULSED LASER BEAM

BACKGROUND OF THE INVENTION

1. Field of the invention

The present invention is directed to light with short wavelengths (300–600 nm) for pulsed laser bonding of metal electrical members in microelectronic applications. In one embodiment a frequency doubled pulsed Nd:YAG laser beam at 1064 nm wavelength is directed to a nonlinear crystal to produce a laser beam with 533 nm and 1064 nm wavelengths.

2. Description of Related Art

Lasers used in microelectronic bonding provide concentrated localized heating. This is especially useful for soldering or welding bonds on electrical interconnects such as customizable copper/polyimide substrates with fine pitch dimensions, low thermal stress tolerance or heat sensitive components.

Yttrium-aluminum-garnet (YAG) crystal doped with neodymium (Nd) can produce a laser beam with a fundamental wavelength of about 1064 nm (1.064 microns) which is infrared radiation (IR) and invisible to the human eye. It has been found that Nd:YAG lasers provide a desirable balance between maximizing the absorption of metals and minimizing the absorption of polymer substrates. The use of 1064 nm Nd:YAG lasers for bonding electrical members in microelectronics is well known in the art; see, for instance, U.S. Pat. No. 4,697,061 to Spater et al, U.S. Pat. No. 4,845,355 to Andrews et al, and U.S. Ser. Nos. 07/405,377 and 07/558,127 to Spletter et al, each of which is hereby incorporated by reference.

Nd:YAG lasers at high frequencies in the range of 300–600 nm wavelengths, in particular the frequency doubled 533 nm wavelength (green light), can provide a substantial increase in the amount of laser energy absorbed by appropriate metal electrical members as they are heated and bonded. M. Greenstein in "Optical Absorption Aspects of Laser Soldering for High Density Interconnects," *Applied Optics*, Vol. 28, No. 21 (Nov. 1, 1989) points out that for both gold and copper metallurgies, the 533 nm wavelength provides significantly more absorption of laser energy than 1064 nm wavelength. Furthermore, as the temperature increases the predicted optical absorption of gold and copper increases as well. For example, Greenstein found that gold plated copper surfaces of TAB lead frames absorb about 40% energy from a pulsed Nd:YAG laser beam at 533 nm wavelength versus about 1%–5% energy absorption at 1064 nm wavelength.

533 nm wavelength radiation can be generated by directing a 1064 nm wavelength pulsed Nd:YAG laser at a nonlinear doubling crystal such as potassium titanyl phosphate. The crystal is affected by the electrical field of the laser beam to produce light with a frequency in the second harmonic at 533 nm wavelength. Upon applying 1064 nm wavelength radiation to the crystal typically 5%–10% is converted to 533 nm radiation and 5%–10% is lost as heat, reflections, etc. Unfortunately the crystal is highly sensitive to orientation and impinged power, and is prone to damage unless used in a very controlled environment. Water cooling is often provided to keep the crystal temperature approximately 30°–40° C.

While recently developed of GaAlAs diode lasers produce efficient and stable 533 nm wavelengths and look promising, current laser powers are in the tens-of milliwatts range which is not sufficient for microelectronic bonding.

Nd:YAG laser outputs can be continuous wave (CW), shuttered with an acousto-optic or electro-optic device (Q-switched), or pulsed. While these outputs are each at 1064 nm wavelength, the peak output powers differ widely and these differences can have a profound effect on the suitability of any Nd:YAG laser for a particular application.

Most currently available frequency doubled Nd:YAG lasers are either Q-switched or CW and as such are not suitable for microelectronic bonding. CW frequency doubled Nd:YAG lasers produce an energy flux that is difficult to control and tend to thermally shock and damage a bond site. Q-switched frequency doubled Nd:YAG lasers produce extremely high peak power for short pulse widths, e.g. kilowatts for nanoseconds, and as such drill or cut through the electrical members instead of bonding them by welding or solder reflow.

Frequency doubled pulsed (FDP) Nd:YAG lasers are typically used for range finding and night vision applications. Commercial vendors include Lumonics Corp. and Kigre Corp. The 533 nm wavelength creates green light which is well absorbed by the human eye. However the lasers employed for these applications have low output power and high repetition rate and therefore are not suitable for microelectronic bonding.

SUMMARY OF THE INVENTION

An object of the present invention is to provide laser bonding for electrical members by contacting first and second metal electrical members to form a bond interface therebetween, and directing a pulsed laser beam with at least 3% of the total beam energy between 300–600 nm wavelength to couple to at least one of the members, thereby bonding the first and second members at the bond interface.

Preferably the 300–600 nm wavelength energy is at least 3 millijoules, at least one of the electrical members comprises copper or gold, and the pulsed laser beam includes a pulsed solid state laser beam with 1064 nm wavelength radiation.

Another object of the present invention is to bond first and second contacting metallic electrical members by directing a FDP solid state laser to couple to at least one of the members. The FDP solid state laser can comprise a fundamental wavelength of about 1064 nm and a frequency doubled wavelength of about 533 nm.

Still a further object is wherein a 1064 nm pulsed solid state laser is directed at a nonlinear crystal to produce frequency doubled radiation at 533 nm wavelength. Suitable nonlinear crystals include lithium iodate (LiIO₃), lithium niobate (LiNbO₃), potassium titanyl phosphate (KTP) and beta barium borate (BBO).

Yet a further object of the present invention is wherein the solid state laser can be generated by various crystals such as yttrium-aluminum-garnet (YAG), yttrium-lithium-flouride (YLF) and yttrium-aluminum-phosphide (YAP), each of which is doped with neodymium (Nd).

A still further object is the frequency doubled solid state laser pulses are at least 30 millijoules and the 533 nm wavelength therein is at least 3 millijoules.

Still another object is to provide laser bonding for gold, gold plated copper, and copper electrical members.

A further object is wherein the first member is a bonding pad on an integrated circuit and the second member is a TAB tape lead. In one embodiment the bonding pad is gold and the TAB tape lead is gold plated copper.

Yet a further object is an apparatus for generating a FDP solid state laser beam wherein the percentage of 533 nm and 1064 nm wavelengths is adjustable by conventional attenuators.

BRIEF DESCRIPTION OF THE DRAWINGS

A better understanding of the present invention can be obtained when the following detailed description of the preferred embodiment is read in conjunction with the following drawings, in which.

DETAILED DESCRIPTION OF THE PREFERRED EMBODIMENTS

Figures 1, 1A, 2:
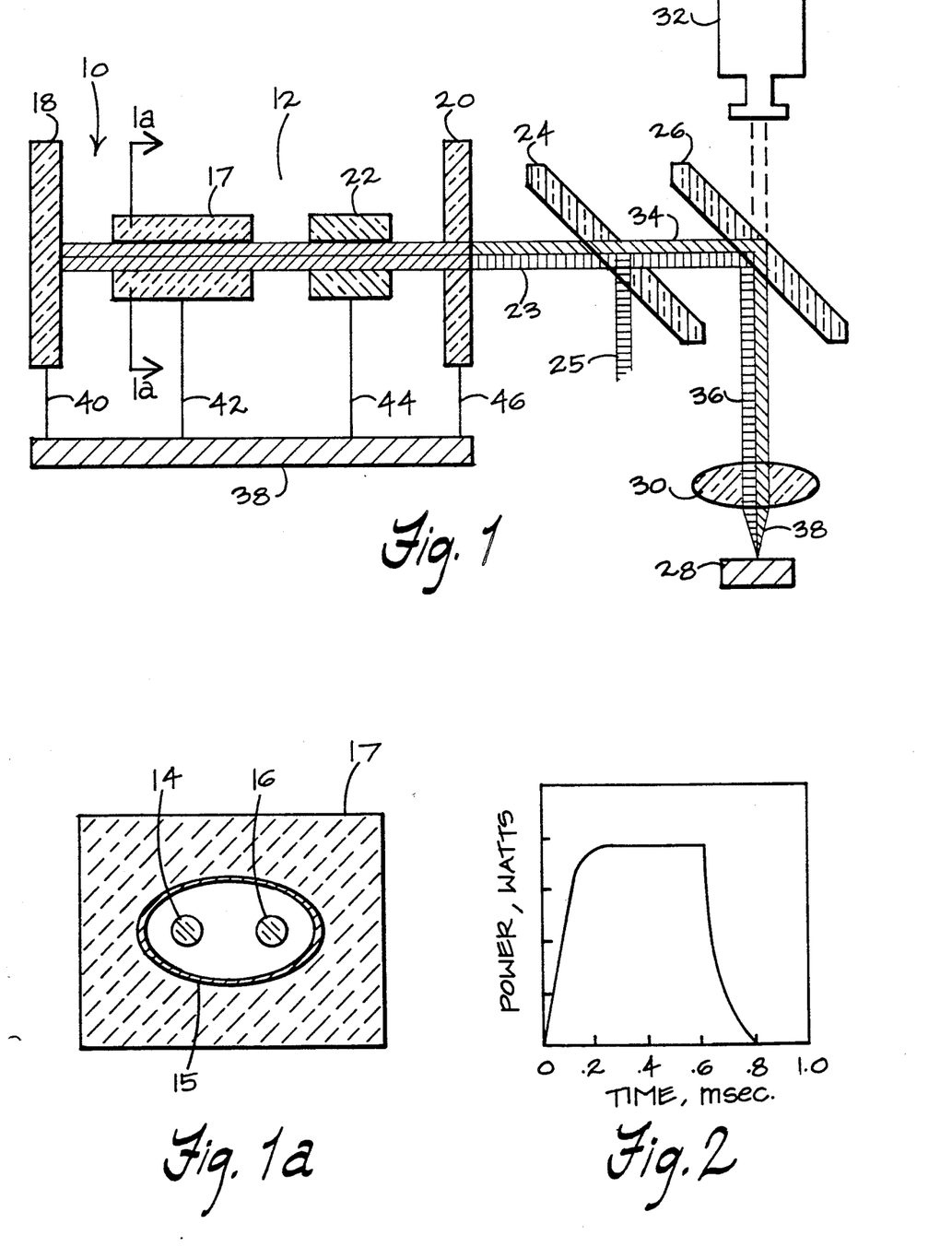
FIG. 1 is a schematic view of an apparatus for generating a FDP Nd:YAG laser beam.
FIG. 1A is a cross-sectional view taken along line 1A—1A of FIG. 1 showing a housing containing a YAG rod and flashlamp.
FIG. 2 is a graph showing the waveform of a pulsed Nd:YAG laser beam.

Referring now to FIGS. 1 and 1A, an apparatus for generating a frequency doubled pulsed (FDP) solid state Nd:YAG laser beam is designated generally as 10. Apparatus 10 contains a cavity 12 comprising elliptical housing 17, which as seen in FIG. 1A contains YAG rod 14 and flashlamp 16 positioned adjacent to one another at the focii of the elliptical chamber inside housing 17. Inside wall 15 of housing 17 is covered with highly reflective gold. YAG rod 14 is pumped with one krypton flashlamp 16 to produce a laser beam in rod 14. YAG rod 14 is positioned and aligned between highly reflective reflector mirror 18 and output reflector mirror 20. Mirror 20 is coated to pass a portion of the light therethough and out cavity 12. Suitable coatings for mirror 20 are conventional and known to those with skill in the art. Flashlamp 16 generates a 1064 nm wavelength pulsed Nd:YAG laser beam. Mirrors 18 and 20 are positioned to reflect the laser beam from rod 14 generated by flashlamp 16 back-and-forth in cavity 12 as well as allowing a portion 23 of the radiation, such as 5%-10%, to exit cavity 12 through output mirror 20.

Inserted into the laser beam path is nonlinear potassium titanyl phosphate (KTP) crystal 22 for frequency doubling. Crystal 22 may be placed either inside or outside the laser cavity 12, referred to as "intracavity" or "extracavity" doubling, respectively. Intracavity frequency doubling produces the most green light because the electric field of the laser is most strong inside the cavity, especially with a multimode laser, and crystal 22 will produce the maximum green light when high power densities are impinged thereon. For this reason an intracavity crystal 22 is shown herein and preferred. It should be noted however that intracavity crystals are more prone to damage from high power densities than extracavity crystals. To overcome this difficulty, as opposed to conventional intracavity frequency doubled lasers, the present invention does not excite the crystal with extremely high power levels in an attempt to generate a high level of green light.

Instead the present invention employs low power 1064 nm wavelength IR, for instance 100 millijoules. As a result laser output 23 is mostly 1064 nm wavelength radiation and only a small percentage of 533 nm radiation is generated (e.g. 5%-15%).

To increase the percentage of 533 nm wavelength radiation, an optional infrared reflector 24 can be placed outside cavity 12 in the path of laser beam 23 to reflect 1064 nm wavelength component 25. Different amounts of IR 25 can be reflected away depending on the coating applied to IR reflector 24.

In another embodiment output mirror 20 was replaced with a similar mirror having a different coating. Depending on the coating applied to output mirror 20, final laser beam 38 could be varied and contain up to 33% of its power from 533 nm wavelength; although 3%-15% 533 nm wavelength with correspondingly 85%-97% 1064 nm wavelength is considered optimal since, within this range, stress is reduced on KTP crystal 22 while sufficient 533 nm wavelength radiation remains to couple into workpiece 28. In one experiment the total amount of green and IR energy was about 5-10 and 50-60 millijoules, respectively, which was considered suitable for bonding gold microelectronic members. At least 3 millijoules of green 533 nm light is preferred to assure reliable bonds.

Workpiece reflector 26 can divert the FDP Nd:YAG laser beam 34 toward workpiece 28 such as copper or gold electrical members to be bonded. Objective lens 30 can focus the FDP Nd:YAG laser beam 36 into laser beam 38 and upon workpiece 28. Video camera 32 can be mounted coaxially behind workpiece reflector 26 to permit viewing workpiece 28 through objective lens 30 as it is irradiated and coupled by the FDP Nd:YAG laser beam 38.

Mirror 18, housing 17, crystal 22 and output mirror 20 can be secured to rail 38 by rail supports 40, 42, 44 and 46 respectively.

A power versus time curve for the 1064 wavelength pulsed Nd:YAG laser of the present invention is shown in FIG. 2. Suitable pulse times for microelectronic bonding are typically between 0.5-5.0 milliseconds, with 0.6-1.75 milliseconds preferred. Flashlamp 16 is turned on and off for each pulse. As a result there is an exponential increase in power output until a maximum level is reached, shown as at 0.6 milliseconds, at which point the power exponentially decreases, shown as zero power at 0.8 milliseconds. With a pulsed laser the metals to be bonded are heated to a maximum temperature at which time the energy input exponentially decreases. The pulsed laser provides a higher power level at the middle of the pulse than the Q-switched laser. However, the peak power is orders of magnitude less than the spike at the beginning of the Q-switch pulse. This exponentially increasing power from the pulsed laser preheats the bond site and provides the bond site with the most power when it can use it most efficiently. It also provides decreasing power which tends to allow less internal stress buildup than the instantaneous dropoff of energy that is characteristic of the Q-switch or CW laser. The pulsed Nd:YAG laser pulse width should be short enough to allow bonding without damaging the surrounding integrated circuit. A 50 watt average power pulse Nd:YAG laser made by Carl Haas Gmbh and Co. was found satisfactory.

Figure 3A:
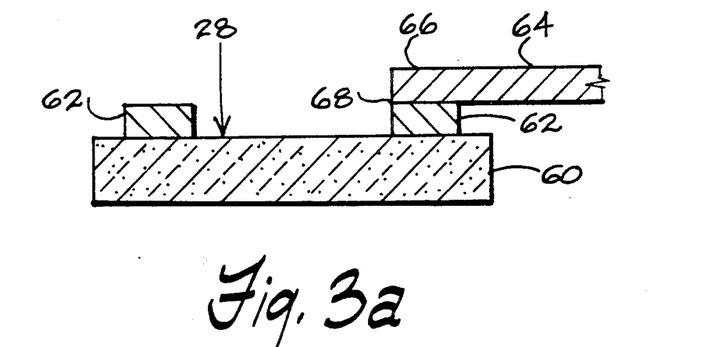
FIG. 3a-3c are cross-sectional views of a microelectronic bond formed by directing a frequency doubled pulsed Nd:YAG laser beam.
Figure 3B:
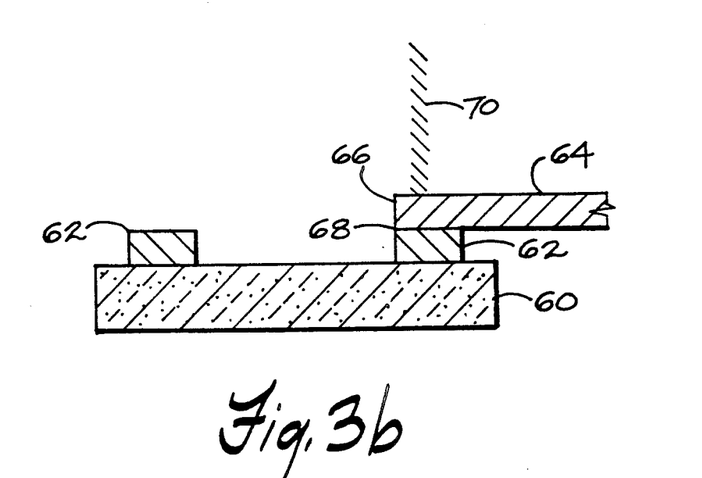
Figure 3C:
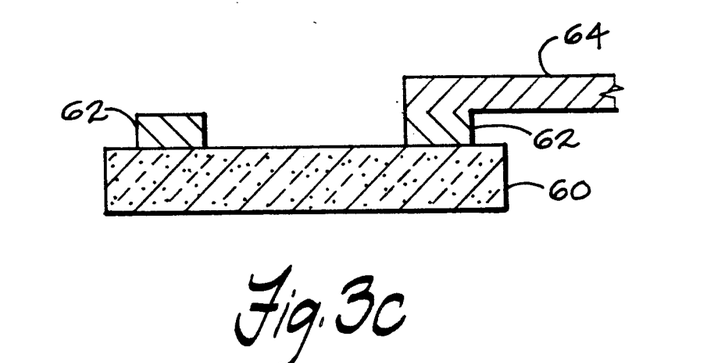

Referring now to FIGS. 3a–3c, workpiece 28 can comprise an integrated circuit die 60 with 1 mil thick gold pads or bumps 62 with each side 4.4 mils long. TAB tape lead 64 is gold plated copper 1.3 mils thick and 3 mils wide. In FIG. 3a lead 64 is aligned with and contacted to bump 62 to form bond site 66 and bond interface 68. In FIG. 3b frequency doubled pulsed Nd:YAG laser beam 70 is generated by apparatus 10 and directed to couple to at least one metal electrical member, shown as lead 64 at bond site 66. Preferably 85% of the power in laser beam 70 is at 1064 nm wavelength and 15% is at 533 nm wavelength. A 10 Hz repetition rate can be used with 100 millijoules per pulse and a 1.75 millisecond pulse width. In FIG. 3c bump 62 is welded and bonded to lead 64 and laser beam 70 is discontinued.

Figure 4A:
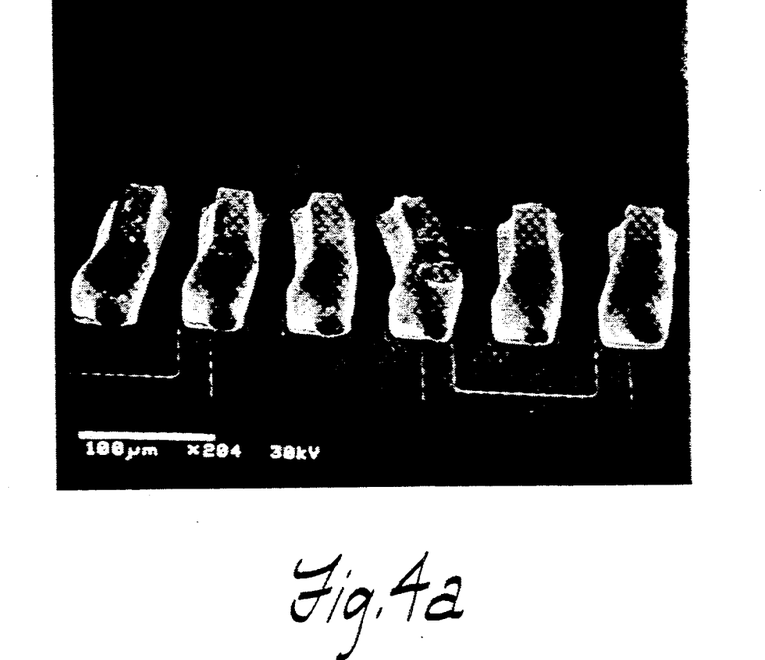
FIG. 4a-4c are photomicrographs of microelectronic bonds formed in accordance with the present invention.
Figure 4B:
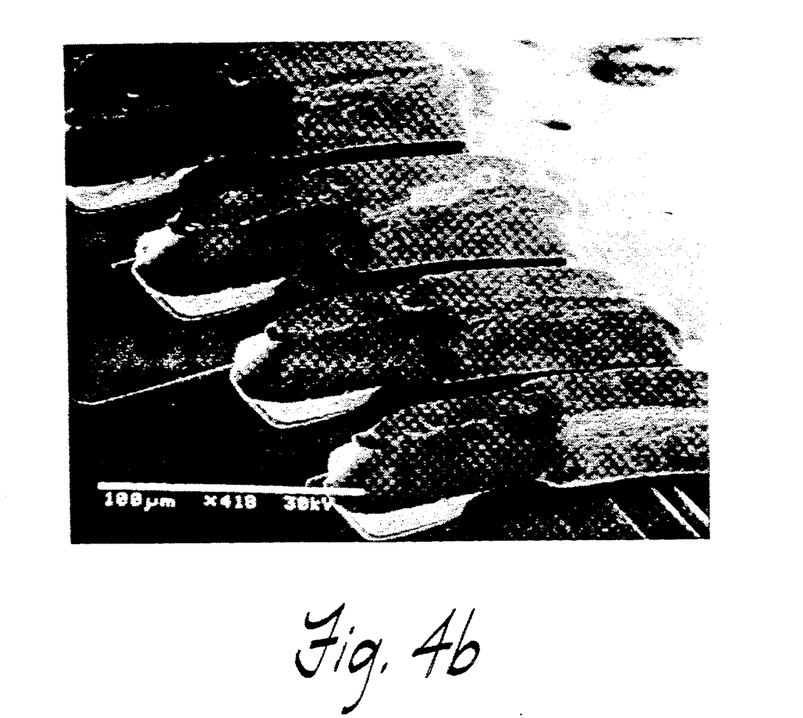
Figure 4C:
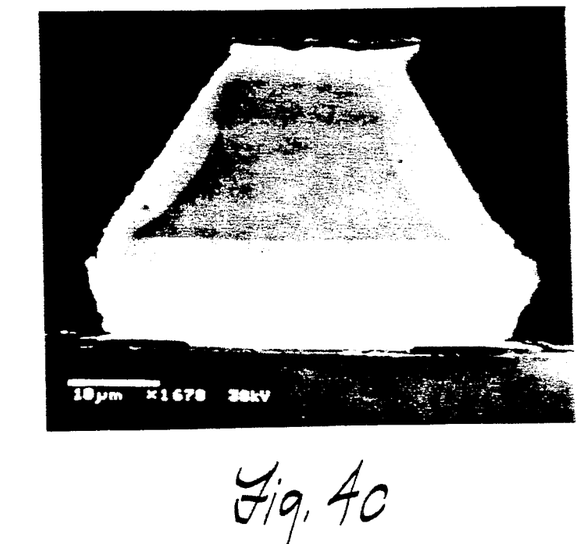

Referring now to FIGS. 4a–4c, scanning electron microscope (SEM) photographs are shown of test bonds fabricated in accordance with the present invention. A high magnification video microscope and tape/die fixturing were set up to enable precise alignment of the laser beam with the target bond site. In particular the tape/die fixture was mounted directly on a rail on which the laser was built to eliminate misalignment caused by movement of the die and/or pedestal when the fixturing was being installed in the laser beam path after alignment. Also, a different output mirror 20 with a different coating was used to allow more green light to come directly from the laser cavity, thus boosting the final laser beam composition to 33% green and 67% IR, thereby eliminating the need to reflect extraneous IR via an infrared reflector. The bonds were formed with approximately 25 millijoules of green light and 50 millijoules of IR. All of the leads shown herein broke in span during pull testing, which indicates the bonds were stronger than the tensile strengths of the leads. FIGS. 4a–4c show the bonds after they were pull tested. FIG. 4a shows bonds with well controlled melting. FIG. 4b shows a closer look at the bonds in which the melt zone is localized to within a 3 mil region. Melting and bonding under the lead is seen at the back of the bond. FIG. 4c is a cross-section of a bond showing complete void-free bonds. The copper lead (the dark grey trapezoid at the center of the lead) is not melted.

In the embodiments previously described, the relative percentages of green light and IR in apparatus 10 that coupled to workpiece 28 were either fixed or only partially adjustable. That is, without IR reflector 24 the percentages of IR and green light were both fixed, whereas with IR reflector 24 the percentages of IR and green light were only partially adjustable in that the percentage of IR could only be decreased and consequently the percentage of green light could only be increased.

Figure 5:
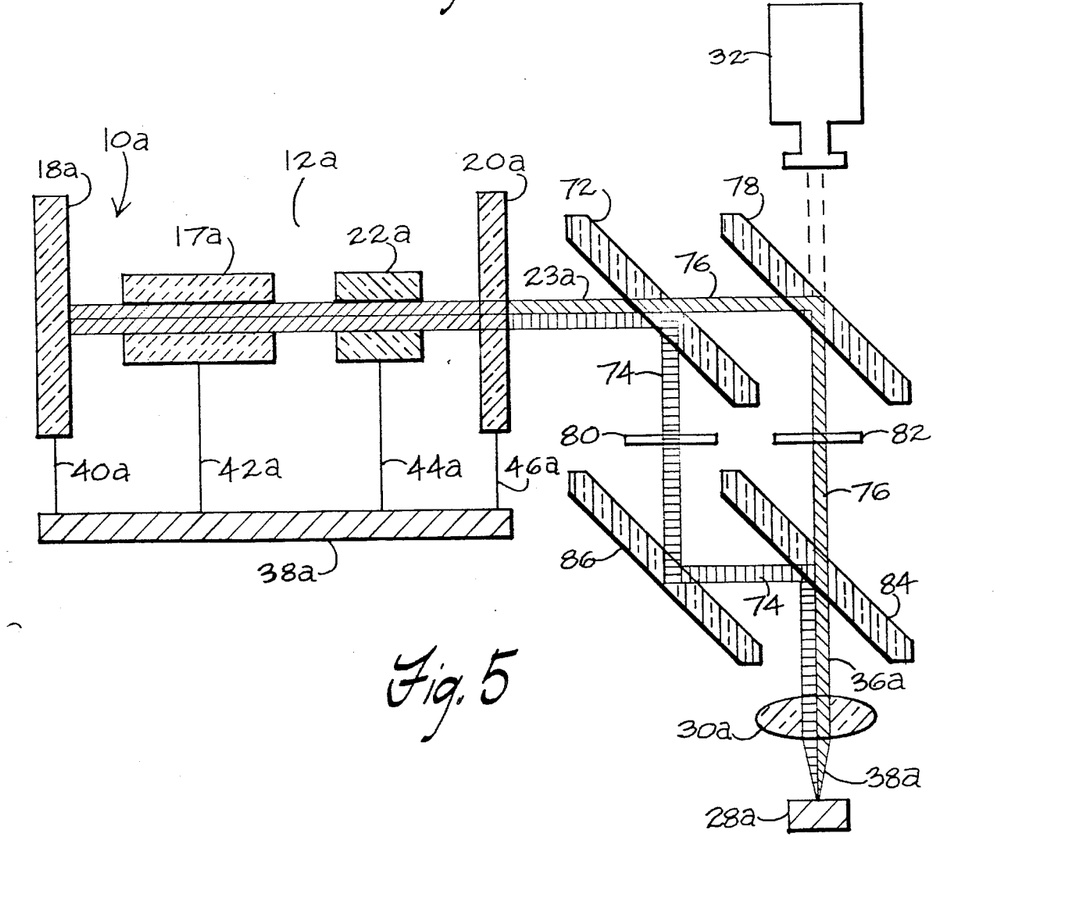
FIG. 5 is a schematic view of another apparatus for generating a FDP Nd:YAG laser beam wherein the fundamental and doubled frequencies can be attenuated separately.

Shown in FIG. 5 is an apparatus which could allow the percentages of green light and IR to be fully adjustable before the laser beam couples to a bond site. In FIG. 5 like parts to FIG. 1 are similarly numbered with the addition of a suffix "a". An apparatus 10a not currently reduced to practice is proposed. Apparatus 10a could allow a FDP Nd:YAG laser beam to be split so that the 1064 nm and 533 nm wavelengths could be separately and independently reduced or attenuated. As previously described FDP Nd:YAG laser beam 23a exits from mirror 20a in cavity 12a. Laser beam 23a could be directed to first dichroic mirror 72 which would split laser beam 23a into 533 nm wavelength component 74 and 1064 nm wavelength component 76 by reflecting predominantly 533 nm component 74. 1064 nm component 76 could be directed to reflector mirror 78 which would reflect 1064 nm component 76 toward IR attenuator 82. Likewise green attenuator 80 could be placed in the path of 533 nm component 74. Attenuators 80, 82 could be adjusted to filter or reduce the desired amounts of components 74, 76 respectively. For example, a stack of neutral density filters could be used so that the number of filters in the stack determines the amount of attenuation. After passing through 1064 nm attenuator 82, 1064 nm component 76 could be directed at second dichroic mirror 84 which like first dichroic mirror 72 would not alter the course of 1064 nm component 76. Returning to 533 nm component 74, after passing through 533 nm attenuator 80, 533 nm component 74 could strike another reflector mirror 86 and be directed toward second dichroic mirror 84. Upon striking second dichroic mirror 84, 533 nm component 74 could be reflected thereby combining components 74 and 76 into a single FDP Nd:YAG laser beam 36a, Laser beam 36a could be directed at objective lens 30a to focus beam 38a on workpiece 28a. Thus by adjusting attenuators 80, 82 the percentage of 1064 nm and 533 nm wavelengths in laser beam 38a could be varied and optimized for a particular workpiece 28a.

The present invention, therefore, is well adapted to carry out the objects and attain the ends and advantages mentioned, as well as others inherent therein. While presently preferred embodiments of the invention have been described for the purpose of disclosure, numerous changes in the steps of the process and the parts of the apparatus will be readily apparent to those skilled in the art, and are encompassed within the spirit of the present invention and the scope of the appended claims. Such changes include Nd:YLF or Nd:YAP laser beams; tin, tin plated, tin-lead, gold alloy or copper alloy electrical members; slight variations in laser beam wavelengths; a coverglass which can be tin coated pressed against the electrical members to hold them in place while permitting the laser beam to couple to at least one of the electrical members; and various coatings and finishes (e.g. bright or matte) on the electrical members.

What is claimed is:

1. A method for laser bonding electrical members, comprising:
   contacting first and second metal electrical members to form a bond interface therebetween;
   generating a pulsed laser beam comprising a first wavelength and a second wavelength between 300–600 nm measuring one-half the first wavelength; and
   directing the pulsed laser beam to focus upon and couple to at least one of the members, thereby bonding the first and second members at the bond interface.

2. The method of claim 1 wherein said at least 3% of the total beam energy is at least 3 millijoules.

3. The method of claim 2 wherein said at least one of the members comprises copper, gold or tin.

4. The method of claim 3 wherein said pulsed laser beam includes a pulsed solid state laser beam with 1064 nm wavelength radiation.

5. A method for laser bonding electrical members, comprising:
   contacting first and second metal electrical members to form a bond interface therebetween; and
   directing a frequency doubled pulsed solid state laser beam comprising a first wavelength and a second wavelength measuring one-half the first wavelength to focus upon and couple to at least one of the members, thereby bonding the first and second members at the bond interface.

6. The method of claim 5 wherein the frequency doubled pulsed laser beam comprises a first wavelength of about 1064 nm and a second wavelength of about 533 nm.

7. The method of claim 6 further comprising the steps of:
   generating a 1064 nm wavelength pulsed solid state laser beam, and
   directing the pulsed 1064 nm wavelength laser beam at a nonlinear crystal to produce the frequency doubled pulsed laser beam.

8. The method of claim 7 wherein the nonlinear crystal is selected from the group consisting of lithium iodate, lithium niobate, potassium titanyl phosphate and beta barium borate.

9. The method of claim 7 wherein the first member is a metal bonding pad on an integrated circuit and the second member is a TAB tape lead.

10. The method of claim 9 wherein the bonding pad is gold and the TAB tape lead is gold plated copper.

11. The method of claim 7 wherein the frequency doubled laser pulses have a total pulse energy of at least 30 millijoules.

12. The method of claim 7 wherein the pulse time is between 0.5 and 5.0 milliseconds.

13. The method of claim 7 wherein the pulse time is between 0.6 and 1.75 milliseconds.

14. The method of claim 7 wherein the 533 nm wavelength forms at least 3% of the laser beam power.

15. The method of claim 14 wherein the 533 nm wavelength forms between 3%-33% of the laser beam power.

16. The method of claim 7 wherein said at least one of the members comprises copper, gold or tin.

17. The method of claim 7 wherein upon coupling to a member the total pulse energy is between 3 and 150 millijoules.

18. The method of claim 7 wherein the upon coupling to a member average pulse power is between 6 and 250 watts.

19. The method of claim 7 wherein upon coupling to a member the total pulse energy is between 3 and 150 millijoules, and the average pulse power is between 6 and 250 watts.

20. The method of claim 7 wherein the generated laser beam is a Nd:YAG laser beam.

21. The method of claim 7 wherein the generated laser beam is a Nd:YLF laser beam.

22. The method of claim 7 wherein the generated laser beam is a Nd:YAP laser beam.

23. A method of laser bonding electrical members, comprising:
   contacting first and second metal electrical members to form a bond interface therebetween;
   generating a 1064 nm wavelength pulsed solid state laser beam;
   directing the 1064 nm wavelength pulsed laser beam at a nonlinear crystal to produce a frequency doubled pulsed laser beam comprising 1064 nm and 533 nm wavelengths;
   directing the frequency doubled pulsed laser beam at an infrared reflector to reduce but not eliminate the 1064 nm wavelength power in the laser beam; and
   directing the frequency doubled pulsed laser beam to focus upon and couple to at least one of the members, thereby bonding the first and second members at the bond interface.

24. The method of claim 23 wherein the nonlinear crystal is selected from the group consisting of lithium iodate, lithium niobate, potassium titanyl phosphate and beta barium borate.

25. The method of claim 23 wherein after passing through the infrared reflector the frequency doubled pulsed laser beam energy comprises at least 3%-33% at 533 nm wavelength with the remainder at 1064 nm wavelength.

26. The method of claim 23 wherein upon coupling to a member the total pulse energy is between 3 and 150 millijoules and the average pulse power is between 6 and 250 watts.

27. The method of claim 23 wherein the laser is a Nd:YAG laser.

28. An apparatus for generating a frequency doubled pulsed Nd:YAG laser, comprising:
   a laser cavity;
   means for generating a 1064 wavelength pulsed Nd:YAG laser beam in the cavity;
   means for frequency doubling the Nd:YAG laser beam in the cavity, wherein 1064 nm wavelength radiation is input and 533 nm and 1064 nm wavelengths radiation are output;
   first and second reflector means at opposite ends of the cavity for reflecting the laser beam back and forth, wherein the second reflector means releases a frequency doubled pulsed Nd:YAG laser beam comprising 533 nm and 1964 nm wavelength radiation with at least 3 millijoules of 533 nm wavelength radiation;
   means for separating the 533 nm and 1064 nm wavelengths;
   means for attenuating the separated 533 nm wavelength;
   means for attenuating the separated 1064 nm wavelength; and
   means for combining the separated and attenuated 533 nm and 1064 nm wavelengths, thereby allowing the percentage of 533 nm and 1064 nm wavelength radiation in the laser beam to be adjusted.

29. An apparatus for generating a frequency doubled pulsed Nd:YAG laser, comprising:
   a Nd:YAG cavity with first and second opposite ends;
   a photonic energy source for generating a 1064 nm wavelength pulsed Nd:YAG laser beam inside the cavity;
   a nonlinear crystal inside the cavity for frequency doubling the pulsed Nd:YAG laser beam, wherein 1064 nm wavelength radiation is input and 533 nm and 1064 nm wavelength radiation is output;
   a first highly reflective reflector mirror positioned at the first end of the cavity;
   a second partially reflective reflector mirror positioned at the second end of the cavity opposite the first mirror, wherein the laser beam is reflected back and forth between the first and second mirrors and through the nonlinear crystal therebetween, and a frequency doubled pulsed Nd:YAG laser beam comprising 533 nm and 1064 nm wavelength radiation with at least 3 millijoules at 533 nm wavelength is released from the cavity through the second mirror;

means for separating the 533 and 1064 nm wavelengths;

means for attenuating the separated 533 nm wavelength;

means for attenuating the separated 1064 nm wavelength; and means for combining the separated and attenuated 533 and 1064 nm wavelengths, thereby allowing the percentage of 533 nm and 1064 nm wavelengths in the laser beam to be adjusted.

30. The apparatus of claim 29 wherein the nonlinear crystal is selected from the group consisting of lithium iodate, lithium niobate, potassium titanyl phosphate and beta barium borate.

31. An apparatus for generating a frequency doubled pulsed Nd:YAG laser, comprising:

a Nd:YAG cavity with first and second opposite ends;

a photonic energy source for generating a 1064 nm wavelength pulsed Nd:YAG laser beam inside the cavity;

a nonlinear crystal inside the cavity for frequency doubling the pulsed Nd:YAG laser beam, wherein 1064 nm wavelength radiation is input and 533 nm and 1064 nm wavelength radiation is output;

a first highly reflective reflector mirror positioned at the first end of the cavity;

a second partially reflective reflector mirror positioned at the second end of the cavity opposite the first mirror, wherein the laser beam is reflected back and forth between the first and second mirrors and through the nonlinear crystal therebetween, and a frequency doubled pulsed Nd:YAG laser beam comprising 533 nm and 1064 nm wavelength radiation with at least 3 millijoules at 533 nm wavelength is released from the cavity through the second mirror; and an infrared reflector to which the laser beam is directed for reducing but not eliminating the 1064 nm wavelength power in the laser beam.

32. The method of claim 1, wherein the pulsed laser is not Q-switched.

33. The method of claim 1, wherein before the temperature of said at least one of the members increases, the second wavelength provides significantly more absorption of laser energy than the first wavelength.

34. The method of claim 33, wherein as the temperature of said at least one of the members increases, the optical absorption of said at least one of the members increases as well.

35. The method of claim 34, wherein said bonding step comprises welding the members together.

36. The method of claim 35, wherein the first wavelength is 1064 nm and the second wavelength is 533 nm.

* * * * *

UNITED STATES PATENT AND TRADEMARK OFFICE
CERTIFICATE OF CORRECTION

PATENT NO. : 5,083,007
DATED : January 21, 1992
INVENTOR(S) : Philip J. Spletter, et al.

It is certified that error appears in the above-identified patent and that said Letters Patent is hereby corrected as shown below:

Column 2, line 1, delete "of".

Column 2, line 66, insert -- wherein -- after "is".

Column 3, line 25, change "Nd;YAG" to --Nd:YAG --.

Column 3, line 26, delete the first instance of "a".

Column 6, line 27, change "36a," to -- 36a. --.

Column 7, line 48, delete "the".

Column 8, line 38, change "1964" to -- 1064 --.

Signed and Sealed this

Thirtieth Day of November, 1993

Attest:

BRUCE LEHMAN

*Attesting Officer*     *Commissioner of Patents and Trademarks*